(12) United States Patent
Janowicz et al.

(10) Patent No.: US 9,909,043 B2
(45) Date of Patent: Mar. 6, 2018

(54) POLYURETHANE ADHESIVE

(71) Applicant: Lucite International, Inc., Cordova, TN (US)

(72) Inventors: Andrew Janowicz, Lakeland, TN (US); Fareeduddin Farooq, Memphis, TN (US)

(73) Assignee: LUCITE INTERNATIONAL, INC., Cordova, TN (US)

( * ) Notice: Subject to any disclaimer, the term of this patent is extended or adjusted under 35 U.S.C. 154(b) by 0 days.

(21) Appl. No.: 14/800,325

(22) Filed: Jul. 15, 2015

(65) Prior Publication Data

US 2016/0009968 A1 Jan. 14, 2016

Related U.S. Application Data

(62) Division of application No. 12/312,140, filed as application No. PCT/US2007/023068 on Oct. 31, 2007, now Pat. No. 9,115,294.

(60) Provisional application No. 60/855,747, filed on Nov. 1, 2006.

(51) Int. Cl.
| | |
|---|---|
| *B32B 27/40* | (2006.01) |
| *C09J 175/04* | (2006.01) |
| *B32B 27/08* | (2006.01) |
| *B32B 27/30* | (2006.01) |
| *C08G 18/83* | (2006.01) |
| *C08G 18/38* | (2006.01) |
| *C08G 18/76* | (2006.01) |
| *C08L 33/04* | (2006.01) |
| *C09D 175/04* | (2006.01) |

(52) U.S. Cl.
CPC .............. *C09J 175/04* (2013.01); *B32B 27/08* (2013.01); *B32B 27/308* (2013.01); *B32B 27/40* (2013.01); *C08G 18/3876* (2013.01); *C08G 18/7664* (2013.01); *C08G 18/83* (2013.01); *C08L 33/04* (2013.01); *C09D 175/04* (2013.01)

(58) Field of Classification Search
CPC ........ B32B 27/08; B32B 27/308; B32B 27/40
See application file for complete search history.

(56) References Cited

U.S. PATENT DOCUMENTS

| | | |
|---|---|---|
| 4,393,187 A | 7/1983 | Baba et al. |
| 4,731,289 A | 3/1988 | Coleman |

(Continued)

FOREIGN PATENT DOCUMENTS

| | | |
|---|---|---|
| DE | 2756708 | 6/1979 |
| JP | H11-507085 | 6/1999 |

(Continued)

OTHER PUBLICATIONS

International Search Report of PCT/US2007/023068, dated Apr. 23, 2008.

(Continued)

*Primary Examiner* — Michael L Leonard
(74) *Attorney, Agent, or Firm* — Jones Day

(57) ABSTRACT

The present invention relates to acrylic compositions capable of bonding directly with an isocyanate-containing composition, e.g. polyurethane, and methods for manufacturing the same. The acrylic compositions of the invention have multifunctional chain transfer agents and/or multifunctional crosslinkers with isocyanate-reactive groups.

25 Claims, 1 Drawing Sheet

(56) References Cited

U.S. PATENT DOCUMENTS

| | | | |
|---|---|---|---|
| 4,973,621 A * | 11/1990 | Buter | C09D 151/003 |
| | | | 524/376 |
| 5,594,065 A | 1/1997 | Tien et al. | |
| 5,700,585 A | 12/1997 | Lee | |
| 6,013,722 A | 1/2000 | Yang et al. | |
| 6,068,797 A * | 5/2000 | Hunt | B29C 37/0032 |
| | | | 264/1.7 |
| 6,172,140 B1 | 1/2001 | Toh et al. | |
| 6,245,855 B1 | 6/2001 | Swarup et al. | |
| 6,297,311 B1 | 10/2001 | Casper et al. | |
| 7,498,395 B2 | 3/2009 | Chisholm et al. | |
| 2003/0190481 A1* | 10/2003 | Peeler | C08G 18/0885 |
| | | | 428/423.1 |
| 2004/0091716 A1* | 5/2004 | Van Den Berg | B05D 7/16 |
| | | | 428/422.8 |
| 2004/0171765 A1 | 9/2004 | Tsuji et al. | |
| 2004/0249026 A1 | 12/2004 | Tsuji et al. | |
| 2005/0277718 A1 | 12/2005 | Johnson | |
| 2006/0014025 A1* | 1/2006 | Peeler | C08G 18/0885 |
| | | | 428/423.1 |
| 2010/0036047 A1 | 2/2010 | Janowicz et al. | |

FOREIGN PATENT DOCUMENTS

| | | |
|---|---|---|
| JP | 2002-506089 | 2/2002 |
| JP | 2002-363246 | 12/2002 |
| JP | 2003-119339 | 4/2003 |
| NZ | 210644 | 10/1987 |
| WO | WO 96/25278 | 8/1996 |
| WO | WO 99/46301 | 9/1999 |
| WO | WO 2001/081495 | 11/2001 |

OTHER PUBLICATIONS

Examination Report dated Aug. 31, 2010 for NZ Patent Application No. 576993.

Supplementary European Search Report dated Apr. 8, 2011 for corresponding European Application No. 07853053.2.

Examination Report dated Jun. 3, 2011 for corresponding Australian Application No. 2007318011.

Examination Report dated Feb. 26, 2013 for corresponding Japanese Application No. 2009-535317.

Official Action and Search Report, dated May 27, 2104, in corresponding Taiwan Application No. 096141248 [English Translation provided].

* cited by examiner

POLYURETHANE ADHESIVE

CROSS REFERENCE TO RELATED APPLICATION

This application is a divisional of U.S. application Ser. No. 12/312,140, filed Apr. 28, 2009, which is a National Phase application of International Application No. PCT/US2007/023068, filed Oct. 31, 2007, which designated the United States and published in English, and which further claims the benefit of U.S. Provisional Application No. 60/855,747, filed Nov. 1, 2006. Each of the foregoing related applications, in their entirety, are incorporated herein by reference.

FIELD OF THE INVENTION

This invention relates to methods for manufacturing an article comprising an acrylic composition. In particular, this invention relates to methods for manufacturing an article comprising (1) an acrylic composition having a multifunctional chain transfer agent; and (2) an isocyanate-containing composition, for example, polyurethane.

BACKGROUND OF THE INVENTION

An article that comprises an acrylic composition and has an acceptable rigidity is a highly desired commercial feature.

One method known in the art to obtain this rigidity is using fiber reinforced plastic (FRP). FRP articles are well known in the art for providing rigidity to articles comprising an acrylic composition. A problem, however, is that the application of FRP is labor intensive, involving the rolling and pushing of it onto the back of a polymer. Also, the application of FRP presents major environmental concerns because it emits high levels of styrene during the application and curing of FRP.

Another way known in the art to increase rigidity of an acrylic composition is to apply polyurethane. However, polyurethane directly applied to an acrylic composition does not adhere well. Therefore, it is known in the art that acrylonitrile-butadiene styrene (ABS) may be laminated to the back of an acrylate polymer prior to applying polyurethane. This lamination step with ABS provides adhesion so that polyurethane may subsequently be applied to it, creating a three layer system having rigidity. This extra step of adding ABS is costly and, time and labor intensive.

Thus a need exists for a method for manufacturing an acrylic composition that exhibits good adhesion directly to polyurethane.

SUMMARY OF THE INVENTION

In one aspect, the invention provides acrylic compositions capable of bonding directly with an isocyanate-containing composition, e.g. polyurethane, and methods for manufacturing the same. Another aspect of the invention provides a method for benefitting from such acrylic compositions wherein the benefit includes receiving a profit, supplying, and/or otherwise introducing such compositions into commerce.

In another aspect, the invention provides acrylic compositions having a multifunctional chain transfer agent capable of bonding directly with an isocyanate-containing composition, and methods for manufacturing the same.

In another aspect, the invention provides acrylic compositions having a multifunctional chain transfer agent with an isocyanate-reactive group in a sufficient amount to bond directly to an isocyanate-containing composition, and methods for manufacturing the same.

In another aspect, the invention provides articles comprising a cured or substantially cured acrylic composition directly bonded to polyurethane, and methods for manufacturing the same. Another aspect of the invention provides a method for benefitting from such articles wherein the benefit includes receiving a profit, supplying, and/or otherwise introducing such articles into commerce.

In another aspect, the invention provides articles comprising an acrylic composition bound to a polyurethane composition, the acrylic composition having bound therein an effective amount of a chain transfer agent and at least one residue thereof, wherein the chain transfer agent residue comprises a reacted isocyanate-reactive group that has reacted with an isocyanate bound within the polyurethane composition.

In another aspect, the invention provides articles comprising cured or substantially cured acrylic composition having a multifunctional chain transfer agent or residue thereof directly bound to isocyanate-containing composition, and methods for manufacturing the same.

In another aspect, the invention provides for articles comprising a bond (e.g. a carbamate bond, a thiocarbamate bond, a carbamide bond, or any other bonds) between an acrylic composition and a polyurethane composition wherein the bond is formed between the residue of a multifunctional chain transfer agent bound within the acrylic composition and a residue of an isocyanate bound within the isocyanate-containing composition, and methods for manufacturing the same.

In another aspect, the invention provides methods for manufacturing articles comprising binding an acrylic composition to a polyurethane substrate. In another aspect, the invention provides methods for manufacturing articles comprising binding an acrylic composition to a polyurethane substrate where the bonding occurs after coating and/or coextruding an acrylic composition onto a polyurethane substrate.

In another aspect, the invention provides methods for manufacturing articles comprising binding polyurethane to an acrylic composition substrate. In another aspect, the invention provides methods for manufacturing articles comprising binding polyurethane to an acrylic composition substrate where the bonding occurs after applying a mixture of an isocyanate-containing composition to a cured or substantially cured acrylic composition substrate, for example, by spraying or contacting the isocyanate-containing composition onto the acrylic composition substrate.

In another aspect, the invention provides methods for manufacturing articles comprising formulating a cured or partially cured acrylic composition having bound within the acrylic polymer matrix a multifunctional chain transfer agent with an isocyanate-reactive group.

In another aspect, the invention provides methods for manufacturing articles comprising formulating an acrylic composition wherein a multifunctional chain transfer agent is added to such composition prior to fully curing the acrylic composition.

In another aspect, the invention provides methods for manufacturing articles comprising formulating a partially cured acrylic composition to form a syrup and then adding a multifunctional chain transfer agent with an isocyanate-reactive group prior to further curing.

In another aspect, the invention provides acrylic compositions having a multifunctional crosslinker capable of bonding directly with an isocyanate-containing composition, and methods for manufacturing the same.

In another aspect, the invention provides acrylic compositions having a multifunctional chain transfer agent and/or a multifunctional crosslinker capable of bonding directly with an isocyanate-containing composition, and methods for manufacturing the same.

In another aspect, the invention provides articles comprising cured or substantially cured acrylic composition having a multifunctional crosslinker or residue thereof directly bound to isocyanate-containing composition, and methods for manufacturing the same.

In another aspect, the invention provides acrylic compositions that further include a crosslinker, initiator, and/or additive, and any combination thereof.

In another aspect, the invention provides a method for improving the efficiency of bonding polyurethane to an acrylic composition, for example, by avoiding a lamination step.

DETAILED DESCRIPTION OF THE INVENTION

Figure 1A:
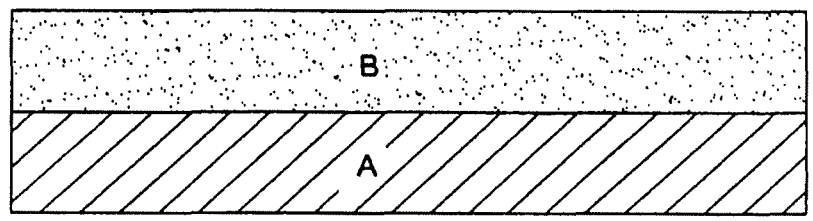
FIG. 1A A pre-cut side elevation view of an acrylic substrate (or ABS in the control samples) (A) with polyurethane (B).

The term "cured" is understood herein to mean that less than 5 wt. % of the acrylic composition is residual unreacted monomer, for example, less than 3 wt. %, or less than 1 wt. %. The amount of residual unreacted monomer may be determined by extracting components from a sample of the acrylic composition with methylene chloride and analyzing the extracted components with capillary gas chromatography to identify the amount, in weight % relative to the total acrylic composition, of unreacted residual monomer.

The present invention comprises acrylic compositions having a multifunctional chain transfer agent capable of bonding directly to an isocyanate-containing composition, and articles and methods of manufacturing such articles comprising the acrylic compositions thereof. The present invention comprises articles having an acrylic composition capable of bonding to an isocyanate-containing composition by virtue of an isocyanate-reactive group being present on a multifunctional chain transfer agent bound within the acrylic polymer matrix. The present invention comprises articles having an acrylic composition with a multifunctional chain transfer agent and other components wherein the acrylic composition is directly bound to an isocyanate-containing composition. The present invention provides articles comprising an acrylic composition substrate bound to a polyurethane composition substrate wherein the acrylic composition is applied to the polyurethane via coating and/or coextrusion, or the polyurethane composition is applied to an acrylic composition substrate via spraying, coating or other means.

Suitable acrylic compositions of the present invention include those comprising at least the following components: an $\alpha,\beta$-ethylenically unsaturated monomer and a multifunctional chain transfer agent. Optionally, the acrylic compositions may additionally comprise copolymers (including acrylate and non-acrylate), comonomers, crosslinkers, initiators, additives, or combinations thereof.

(1) $\alpha,\beta$-Ethylenically Unsaturated Monomer

Suitable $\alpha,\beta$-ethylenically unsaturated monomers include methacrylate monomers, acrylate monomers, vinyl monomers, and styrene monomers.

Non-limiting examples of suitable methacrylate monomers include: monofunctional methacrylate monomers such as alkyl, for example, $C_1$ to $C_{20}$ alkyl, methacrylates, for example, methyl methacrylate, ethyl methacrylate, propyl methacrylate, isopropyl methacrylate, n-butyl methacrylate, iso-butyl methacrylate, t-butyl methacrylate, pentyl methacrylate, 2-ethylhexyl methacrylate, heptyl methacrylate, octyl methacrylate, isooctyl methacrylate, nonyl methacrylate, decyl methacrylate, isodecyl methacrylate, dodecyl methacrylate, tridecyl methacrylate, or undecyl methacrylate; cyclic alkyl methacrylate monomers such as cyclohexyl methacrylate, isobornyl methacrylate, bornyl methacrylate, tricyclodecanyl methacrylate, dicyclopentanyl methacrylate, dicyclopentenyl methacrylate, cyclohexyl methacrylate, benzyl methacrylate, 4-butylcyclohexyl methacrylate, and dicyclopentenyl methacrylate; and methacrylic acid. Mixtures of more than one methacrylate monomer may be used.

The acrylic compositions of the present invention include between 0-100 wt. % of methacrylate monomer, based on the total weight of monomer. Preferably, the acrylic composition includes greater than about 30 wt. %, such as, for example, 50 wt. % or greater, 80 wt. % or greater, and preferably 90 wt. % or greater, of methacrylate monomer, based on the total weight of monomer. Preferred methacrylate monomers are methyl methacrylate, ethyl methacrylate, 2-ethylhexyl methacrylate and n-butyl methacrylate.

Non-limiting examples of suitable acrylate monomers include methyl acrylate, ethyl acrylate, propyl acrylate, butyl acrylate, pentyl acrylate, hexyl acrylate, octyl acrylate, nonyl acrylate, isodecyl acrylate, lauryl acrylate, isobutyl acrylate, t-butyl acrylate, 2-ethylhexyl acrylate, cyclohexyl acrylate, methylcyclohexyl acrylate, trimethylcyclohexyl acrylate, tertiarybutylcyclohexyl acrylate, isobornyl acrylate, and acrylic acid. Mixtures of more than one acrylate monomer may be used.

The acrylic compositions of the present invention include between 0-100 wt. % of acrylate monomer, based on the total weight of monomer. Preferably, the acrylic composition includes greater than 0.01% of acrylate monomer. For example, the composition can be 0-50%, 0.01-20%, and preferably 4-6% of acrylate monomer, based on the total weight of monomer. Preferred acrylate monomers are methyl acrylate, ethyl acrylate, and n-butyl acrylate.

Non-limiting examples of suitable vinyl monomers include N-vinyl pyrrolidone, N-vinyl caprolactam, vinyl imidazole, divinyl benzene and derivatives thereof, vinyl pyridine, hydroxybutyl vinyl ether, lauryl vinyl ether, cetyl vinyl ether, and 2-ethylhexyl vinyl ether. Mixtures of more than one vinyl monomer may be used.

The acrylic compositions of the present invention include between 0-50 wt. % of vinyl monomer, based on the total weight of monomer. Preferably, the acrylic composition includes greater than about 0.01 wt. % of vinyl monomer. For example, the composition can include between 1-50 wt. % of a vinyl monomer, such as 2 wt. % or greater, 20 wt. % or greater, and preferably between 4-6 wt. %, of vinyl monomer, based on the total weight of monomer. Preferred vinyl monomers are N-vinyl pyrrolidone, N-vinyl caprolactam, and vinyl pyridine.

Non-limiting examples of suitable styrene monomers include: styrene and styrene derivatives, for example, alkyistyrene, hydroxystyrene, halostyrene, alkylhalostyrene, alkoxystyrene, alkyletherstyrene, alkylsilylstyrene and carboxyalkyl styrene. Examples of suitable styrene monomers for inclusion in the acrylate compositions of the present invention include, but are not limited to, methylstyrene, α-methylstyrene, p-methylstyrene, p-hydroxystyrene, m-hydroxystyrene, ethylstyrene, butylstyrene, p-tert-butylstyrene, dimethylstyrene, chiorostyrene, bromostyrene, fluorostyrene, chloromethylstyrene, methoxystyrene, and carboxymethyistyrene. Mixtures of more than one styrene monomer may be used.

The acrylic compositions of the present invention include between 0-50 wt. % of styrene monomer, based on the total weight of monomer. Preferably, the acrylic composition includes greater than about 0.01 wt. % of styrene monomer. For example, the composition can include between 1-50 wt. % of a styrene monomer, such as 2 wt. % or greater, 20 wt. % or greater, and preferably 4-6 wt. %, of styrene monomer, based on the total weight of monomer. Preferred styrene monomers are styrene, methylstyrene, α-methylstyrene, p-methyistyrene, p-hydroxystyrene, and m-hydroxystyrene.

The acrylic compositions of the present invention include between 0-99.9 wt. % of monomers, based on the total weight of the acrylic composition. Preferably, the acrylic composition includes greater than about 5 wt. %, such as, for example, 7 wt. % or greater, 30 wt. % or greater, and preferably 50 wt. % or greater of monomers, based on the total weight of the acrylic composition. Preferred monomers are methacrylate monomers.

The acrylic composition of the present invention may comprise a mixture of any of the aforementioned monomers and/or any chemically modified monomers thereof, for example, chemically modified methacrylate, such that a chemically modified monomer increases stability of the acrylic composition.

(2) Multifunctional Chain Transfer Agent

Suitable multifunctional chain transfer agents include compounds comprising at least one chain transfer moiety and an isocyanate-reactive moiety. A chain transfer moiety is one that reacts (or is capable of reacting) with a growing polymer radical causing the growing chain to terminate while creating a new free radical capable of initiating (or re-initiating) polymerization. This re-initiation effectively binds the chain transfer residue to the terminus of the newly forming free radical polymer (or terminal to several newly formed free radical polymers if more than one chain transfer moieties are present and function to transfer the free radical polymer chain). Often chain transfer moieties may also be isocyanate-reactive moieties, suitable multifunctional chain transfer agents in these instances include those wherein at least two such moieties are present such that at least one may serve as a chain transfer moiety binding with the free radical polymer and at least one further remains to serve as the isocyanate-reactive moiety.

Preferred multifunctional chain transfer agents include those which comprise at least one thio group and at least one further thio group or other isocyanate-reactive group. Other isocyanate-reactive groups include carboxyl, anhydro, amido, amino, and/or mercapto groups. Non-limiting examples of suitable multifunctional chain transfer agents include those which may be chosen from a range of thiol compounds, including, but not limited to, mercaptocarbonyls, mercaptoesters, mercaptoamines, mercaptocarboxylic acids and mercaptoalcohols, for example, thioglycollic acid, mercaptopropionic acid, alkyl thioglycollates such as 2-ethyl hexyl thioglycollate or octyl thioglycollate, mercaptoethanol, mercapto butanol, mercaptoundecanoic acid, thiolactic acid, thiobutyric acid, 2-aminothiophenol, 3-aminothiophenol, 4-aminothiophenol, and 6-mercapto-1-hexanol. In addition, the multifunctional chain transfer agents may include, but are not limited to, trifunctional compounds such as pentaerythritol tris(3-mercaptopropionate), pentaerythritol tris(2-mercaptoacetate), trimethylolpropane tris (2-mercaptoacetate), and trimethylol propane tris(3-mercaptopropionate); tetrafunctional compounds such as pentaerythritol tetra(3-mercaptopropionate)(PETMP), pentaerythritol tetra(2-mercaptoacetate), pentaerythritol tetrathioglycollate, pentaerythritol tetrathiolactate, pentaerythritol tetrathiobutyrate; hexafunctional compounds such as dipentaerythritol hexa(3-mercaptopropionate), dipentaerythritol hexathioglycollate; octafunctional thiols such as tripentaerythritol octa(3-mercaptopropionate), tripentaerythritol octathioglycollate. Optionally, the multifunctional chain transfer agent may comprise a mixture of more than one multifunctional chain transfer agent.

The acrylic compositions of the present invention include between about 0.001 to about 20.0 wt. % of multifunctional chain transfer agent, based on the total weight of the acrylic composition. For example, the acrylic composition may include greater than 0.26 wt. %, greater than 0.3 wt. %, greater than 0.4 wt %, greater than 0.5 wt %, and greater than 1.0 wt % of the multifunctional chain transfer agent, based on total weight of the acrylic composition. The acrylic composition may include between 0.5-10 wt. %, and preferably between 0.01-1 wt. % of the multifunctional chain transfer agent, based on the total weight of the acrylic composition. Preferred multifunctional chain transfer agents are pentaerythritol tris(3-mercaptopropionate), pentaerythritol tris(2-mercaptoacetate), pentaerythritol tetra(2-mercaptoacetate), pentaerythritol tetra(3-mercaptopropionate), and trimethylolpropane tris (2-mercaptoacetate).

(3) Crosslinker

In addition, the composition of the present invention may include one or more multifunctional crosslinking agents. Such a crosslinking agent can include any multifunctional compounds polymerizable with a methacrylol group. Non-limiting examples of such crosslinking agents include diethylene glycol dimethacrylate, 1,4-butanediol dimethacrylate, 1,3-butylene glycol dimethacrylate, cyclohexane dimethanol dimethacrylate, diethylene glycol dimethacrylate, dipropylene glycol dimethacrylate, ethylene glycol dimethacrylate, 1,6-hexanediol dimethacrylate, neopentyl glycol dimethacrylate, tetraethylene glycol dimethacrylate, triethylene glycol dimethacrylate, tripropylene glycol dimethacrylate, pentaerythritol trimethacrylate, pentaerythritol triacrylate, trimethylolpropane trimethacrylate, dipentaerythritol pentamethacrylate, di-trimethylolpropane tetramethacrylate, pentaerythritol tetramethacrylate, dipentaerythritol hexamethacrylate, divinyl esters such as divinyl adipate, and other divinyl compounds such as divinyl sulfide or divinyl sulfone compounds of allyl methacrylate, cyclohexanedimethanol divinyl ether diallylphthalate, diallyl maleate, dienes such as butadiene and isoprene, and mixtures thereof.

The acrylic compositions of the present invention include between about 0.001 to about 5.0 wt. % of crosslinker, based on the total weight of the acrylic composition. For example, the composition can include 0.01 wt. % or greater, 0.05, 0.1, 0.5, 1.0 wt. % or greater crosslinking agent(s), and preferably 0.05, 0.1 or 0.5 wt. % crosslinking agent, based on the total weight of the acrylic composition.

(4) Initiators

The composition of the present invention may also include one or more polymerization initiators. Non-limiting examples of such initiators include organic peroxides such as diacyls, peroxydicarbonates, monoperoxycarbonates, peroxyketals, peroxyesters, dialky peroxides, diaryl peroxides, and hydroperoxides, for example, lauroyl peroxide. Also useful are azo initiators, examples of which are: azobisisobutyronitrile, azobisisobutyramide, 2,2'-azo-bis(2,4-dimethylvaleronitrile), azo-bis(α-methyl-butyronitrile) and dimethyl-, diethyl- or dibutyl azo-bis(methylvalerate), 4,4-azobis(4-cyanovaleric acid), 2,2-azobis-isobutyric acid dimethyl ester, 1,1-azobis(hexahydrobenzonitrile), 2,2'-azobis(2-methylbutyronitrile), 1,1-azo-bis-(isobutyramidine) dihydrochloride, 1,1-azobis(1-cyanocyclohexane), 2,2'-azobis[2-(5-methyl-2-imidazolin-2-yl)propane]dihydrochloride, 2,2'-azobis[2-(2-imidazolin-2-yl)propane disulfate dihydrate, 2,2'-azobis[N-(2-carboxyethyl)-2-methylpropionamidine]tetrahydrate, 2,2'-azobis{2-[1-(2-hydroxyethyl)-2-imidazolin-2-yl]propane}dihydrochloride, 2,2'-azobis{2-methyl-N-[1,1-bis(hydroxymethyl)-2-hydroxyethyl] propionamide}, 2,2'-azobis[2-methyl-N-(2-hydroxyethyl) propionamide], 2,2'-azobis[2-(2-imidazolin-2-yl)propane] dihydrochloride, 2,2'-azobis(2-methylpropionamide) dihydrochloride, 2,2'-azobis[2-(3,4,5,6-tetrahydropyrimidin-2-yl)propane] dihydrochloride, 2,2'-azobis[2-(2-imidazolin-2-yl)propane], 2,2'-azobis{2-methyl-N-[2-(1-hydroxybuthyl)]propionamide}, 2,2'-azobis(4-methoxy-2,4-dimethyl valeronitrile), dimethyl 2,2'-azobis(2-methylpropionate), 1,1'-azobis(cyclohexane-1-carbonitrile), 1-[(cyano-1-methylethyl)azo]formamide, 2,2'-azobis(N-cyclohexyl-2-methylpropionamide), 2,2'-azobis[N-(2-propenyl)-2-methylpropionamide], and 2,2'-azobis(N-butyl-2-methylpropionamide), and mixtures thereof.

The amount of initiator(s) used can be determined according to the necessary amount to achieve the desired properties as known to those skilled in the art. For example, the acrylic compositions of the present invention include between about 0.001 to about 5 wt. % of initiator, based on the total weight of the acrylic composition. Preferably, the acrylic composition includes between 0.01-5 wt. %, or 0.01-2.5 wt. %, based on the total weight of the acrylic composition. For example, the amount of initiator may be 0.01 wt. % or greater, 0.03 wt. %, 0.1 wt. %, 1.0 wt. %, or even 2.0 wt. % or greater, and preferably 0.01, 0.03 or 0.1 wt. % initiator, based on the total weight of the acrylic composition.

(5) Additives

In addition to the above components, the present invention can include one or more additional additives used to regulate various chemical and physical properties of the composition and/or polymerized articles made therefrom. Non-limiting examples of such additives include: lubricants, stabilizers, coupling agents, matting agents, toners, anti-fogging agents, fading inhibitors, thermal stabilizers, antioxidants, metal scavengers, fluorescent whiteners, surfactants, plasticizers, flame/fire retardants, dye precursors, fungicides, antimicrobial agent, including Microban™ (triclosan), antistatic agents, magnetic substances, deglossers, organic deglossers, polymeric deglossers, processing aid, UV absorbers, and UV stabilizers.

The acrylic compositions of the present invention include between about 0.001 wt. % to about 10.0 wt. % of the aforementioned additive(s), based on the total weight of the acrylic composition. For example, the amount of additive(s) may be from about 0.01 wt. % to about 5 wt. %, or 0.1 wt. % to about 2.5 wt. %, based on the total weight of the acrylic composition. Also, the amount of additive may be 0.01 wt. % or greater, 0.03 wt. %, 0.1 wt. %, 1.0 wt. %, or even 2.0 wt. % or greater, and preferably 0.01, 0.03 or 0.1 wt. % additive, based on the total weight of the acrylic composition.

In some embodiments of the present invention, the acrylic composition may also comprise an impact modifier. The impact modifier resin added, for example by blending, to the acrylic composition is in an amount corresponding to about 1 wt. % to about 70 wt. %, preferably 5 wt. % to 50 wt. %, based on the total weight of the acrylic composition. Impact modifiers include those comprising one of several different rubbery modifiers such as graft or core shell rubbers or combinations of two or more of these modifiers. Non-limiting examples of impact modifiers are illustrated by acrylic rubber, ASA rubber, diene rubber, organosiloxane rubber, ethylene propylene diene monomer (EPDM) rubber, styrene-butadiene-styrene (SBS) rubber, styrene-ethylene-butadiene-styrene (SEBS) rubber, acrylonitrile-butadiene-styrene (ABS) rubber, methacrylate-butadiene-styrene (MBS) rubber, styrene acrylonitrile copolymer, and glycidyl ester impact modifier. Suitable impact modifiers are graft or core shell structures with a rubbery component with a $T_g$ below 0° C., preferably between about −40° C. to 80° C., composed of poly alkylacrylates or polyolefins grafted with polymethylmethacrylate (PMMA) or styrene acrylonitrile (SAN). Any rubber may be used as an impact modifier as long as the impact modifier does not negatively impact the physical or aesthetic properties of the acrylic composition. Mixtures of more than one impact modifier may be used.

In some embodiments of the present invention, the acrylic composition may also comprise a visual effect enhancer, including colorant, dye, or pigment, which may be present in an encapsulated form, a non-encapsulated form, or laminated to a particle comprising polymeric resin. Visual effect enhancers in encapsulated form usually comprise a visual effect material such as a high aspect ratio material like aluminum flakes encapsulated by a polymer. The encapsulated visual effect enhancer has the shape of a bead.

Some non-limiting examples of visual effect enhancers are aluminum, gold, silver, copper, nickel, titanium, stainless steel, nickel sulfide, cobalt sulfide, manganese sulfide, metal oxides, white mica, black mica, pearl mica, synthetic mica, mica coated with titanium dioxide, and metal-coated glass flakes. Dyes, including fluorescent dyes, may also be used. Pigments such as titanium dioxide, zinc sulfide, carbon black, cobalt chromate, cobalt titanate, cadmium sulfides, iron oxide, sodium aluminum sulfosilicate, sodium sulfosilicate, chrome antimony titanium rutile, nickel antimony titanium rutile, and zinc oxide may be employed.

Additionally, visual effect enhancers may include particles of polymeric material such as polyethylene or polypropylene, an acrylonitrile/butadiene/styrene copolymer, or a poly(ethylene terephthalate) polymer. In another embodiment of the present invention, the polymeric particle comprises a polyalkyl (meth)acrylate or a copolymer of two or more polyalkyl (meth)acrylates. Also, the particles may comprise multifunctional methacrylate monomers, for example, a ($C_2$-$C_{18}$)alkanediol dimethacrylate, and, in another embodiment, a ($C_4$-$C_8$)alkanediol methacrylate. In another embodiment, the particle may comprise a polymer selected from the group consisting of 1,2-ethanediol di(meth)acrylate; 1,3-propanediol di(meth)acrylate; 1,4-butanediol di(meth)acrylate; 1,5-pentanediol di(meth)acrylate; 1,6-hexanediol di(meth)acrylate; 1,8-octanediol di(meth) acrylate; and 1,10-decanediol di(meth)acrylate, and, more preferably, the polymer comprises 1,6-hexanediol diacrylate ("HDDA") or 1,4-butanediol diacrylate. In one embodiment of the invention, the particles are composed of cross-linked polymers, for example, a cross-linked polyacrylate, which may be derived from a continuous cast cross-linked polymer sheet. In another embodiment, the particle comprises a polymer of an aromatic monomer. Non-limiting examples of aromatic monomers include, but are not limited to: styrene; divinylbenzene; divinylnaphthalene; diallyl phthalate; and N,N-divinyl aniline.

When polymeric particles are used in the present invention, such particles may be cured after they are formed by polymerization. Curing may be by any suitable means, such as chemical or heat curing. Mixtures of more than one visual effect enhancer may be used.

The acrylic compositions of the present invention may include between about 0.01 to about 40 wt. % of visual effect enhancer(s), based on the total weight of the acrylic composition. A preferred acrylic composition may include between 0.1-30 wt. %, and more preferably between 1-20 wt. %, based on the total weight of the acrylic composition. A mixture of different visual effect enhancer particles may be used to provide different appearances, e.g. to simulate the appearance of natural materials such as stone or granite.

In some embodiments, the present invention may comprise a filler such as mineral filler. Mineral filler is a particulate mineral compound. The acrylic composition may contain 5-90 wt. % of the filler, preferably 10-80 wt. %, for example, about 67 wt. %, based on the total weight of the acrylic composition. A mixture of more than one mineral compound may be used as the filler.

The type and amount of additives used throughout the invention can be determined according to the necessary amount to achieve the desired properties as known to those skilled in the art.

Polymerization of Acrylate

The acrylic compositions can be made by conventional free radical or other polymerisation techniques, for example bulk, solution, emulsion, dispersion, or suspension, in combination with other techniques such as cell-casting. Monomer(s) are caused to polymerise by initiating the polymerisaton reaction, normally by means of activating the added initiator, and maintaining suitable conditions, e.g. an elevated temperature, pressure etc. until the required degree of polymerisation has been achieved. Such methods are already well known to the skilled person and a large number of such methods exist in the art.

The acrylic composition resulting from the polymerization may be in a multitude of forms including, powder, pellets, syrup (partially cured), suspension, solution, emulsion, film, resin, and sheet. Each of these aforementioned forms may be partially or fully cured.

Isocyanate-Containing Composition

The acrylic composition, described above, may be cured or partially cured prior to applying an isocyanate-containing composition onto the acrylic composition. Alternatively, the isocyanate-containing composition can be formed first, for instance as a substrate. Isocyanate-containing compositions may include urethane-containing compositions, such as a mixture of polyurethane, polyol, and unreacted-isocyanate groups. A preferred isocyanate-containing composition is polyurethane. These are primarily formulated from polyisocyanates and polyols. Although other suitable isocyanate-containing compositions may work, the preferred isocyanate-containing composition is prepared by mixing polyol and polyisocyanate components and allowing the reactants to react and form a polyurethane. In some instances, polyisocyanates are mixed with a small amount of polyols and allowed to react to form a prepolymer of polyurethane. This prepolymer is often formed to allow for greater stability of the isocyanate component during shipping and handling.

(1) Polyisocyanate

Typically, polyisocyanates include aromatic, cycloaliphatic and/or aliphatic polyisocyanates.

Non-limiting examples of suitable aromatic polyisocyanates include: any isomers of toluene diisocyanate (TDI) either in the form of pure isomers or in the form of a mixture of several isomers, naphthalene-1,5-diisocyanate (NDI), naphthalene-1,4-diisocyanate (NDI), 4,4'-diphenylmethane-diisocyanate (MDI), 2,4'-diphenylmethane-diisocyanate (MDI), xylylenediisocyanate (XDI), 2,2-diphenylpropane-4,4'-diisocyanate, p-phenylene diisocyanate, m-phenylene diisocyanate, diphenyl-4,4'-diisocyanate, diphenylsulphone-4,4'-diisocyanate, 1-chlorobenzene-2,4-diisocyanate, 4,4', 4"-triisocyanato-triphenyl-methane, 1,3,5-triisocyanato-benzene, 2,4,6-triisocyanato-toluene, furfurylidene diisocyanate, and mixtures thereof.

Non-limiting examples of suitable cycloaliphatic polyisocyanates include 4,4'-dicyclohexylmethane diisocyanate ($H_{12}$ MDI), 3,5,5-trimethyl-3-isocyanatomethyl-1-isocyanato-cyclohexane (isophorone-diisocyanate, IPDI), cyclohexane-1,4-diisocyanate, cyclohexane-1,2-diisocyanate, hydrogenated xylylene diisocyanate ($H_6$ XDI), m- or p-tetramethylxylylene diisocyanate (m-TMXDI, p-TMXDI), diisocyanate from dimer acid, and mixtures thereof.

Non-limiting examples of suitable aliphatic isocyanates include hexane-1,6-diisocyanate (HDI), 2,2,4-trimethyl-hexane-1,6-diisocyanate, 2,4,4-trimethylhexane-1,6-diisocyanate, butane-1,4-diisocyanate and 1,12-dodecane diisocyanate ($C_{12}$ DI). Particularly preferred for maximum formulation stability is a liquid mixture of 4,4'-diphenyl-methane-diisocyanate, 2,4'-diphenylmethane-diisocyanate, and mixtures thereof.

(2) Polyol

Typically, polyols for making the polyurethane composition may be selected from polyetherpolyols, polyester polyols and/or aromatic polyols.

A polyether polyol is understood to be a linear polyether containing predominantly two OH groups. The preferred polyether polyols are diols corresponding to the general formula HO(—R—O)$_m$—H, where R is a hydrocarbon radical containing 2 to 4 carbon atoms and m is in the range from 4 to 225 on average. Non-limiting examples of such suitable polyether polyols include polyethylene glycol, polybutylene glycol, polytetramethylene glycol (polyTHF) and, above all, polypropylene glycol (R=—CH$_2$CH(CH$_3$)—). Such polyether polyols may be prepared by known methods such as, for example, polymerization of one or more cyclic ether monomers such as ethylene oxide, propylene oxide, n-butene oxide, and tetrahydrofuran. The polyether polyols may be used both as homopolymers and as copolymers, both as block copolymers and as statistical (random) copolymers. Only one type of polyether polyol is preferably used, although mixtures of 2 to 3 polyether polyols differing in their average molecular weight and/or in the nature of their structural elements may also be used. Small quantities of a trifunctional polyether polyol (i.e., a polyether triol) may also be present in the mixture. The average molecular weight (number average molecular weight) of the polyether polyols is in the range from 200 to 10,000 and preferably in the range from 400 to 6,000.

A polyester polyol is understood to be a polyester having more than 1 OH group, preferably 2 terminal OH groups. Preparation is by known routes, either from a) aliphatic hydroxycarboxylic acids, or from b) aliphatic and/or aromatic dicarboxylic acids having from 6 to 12 C atoms and—particularly even-numbered—diols having from 4 to 8 C atoms.

An aromatic polyol is understood to be an alkoxylation product of an aromatic polyhydroxy compound. These are, in particular, the reaction products of ethylene oxide and/or propylene oxide with aromatic dihydroxy compounds such as, for example, hydroquinone, resorcinol, pyrocatechol, bis-(hydroxydiphenyl), bisphenol A, bisphenol F, isomers of dihydroxynaphthalene (pure isomers or a mixture of several isomers), isomers of dihydroxyanthracene (pure isomer or isomer mixture) or isomers of dihydroxyanthraquinone.

The isocyanate-containing compositions of the present invention may include an excess amount of isocyanate to polyol. For example, the isocyanate may range from about 1.01 to about 10.0 moles, about 1.1 to about 5.0 moles, and about 1.2 to about 2.0 moles, to each 1 mole of polyol. Preferably, the amount of isocyanate is about 1.4 to about 1.6 moles relative to the moles of polyol.

Adhesion Test

The adhesion, i.e., bond strength, required between a polyurethane composition substrate and an acrylic composition substrate in an article is that amount which is necessary to maintain adhesion during the normal course of shipping, handling, installation and/or use of the article for a duration of time, for example, over many years. Such adhesion represents "commercially acceptable" adhesion. Presently, in the marketplace, systems comprising an acrylic composition linked to polyurethane by an ABS laminate have superior adhesion. Articles of the present invention have at least "commercially acceptable" adhesion and preferably have at least superior adhesion or better than superior adhesion.

Uses

In some embodiments, the acrylic composition of the present invention may be prepared in a variety of forms to facilitate their use in methods of the present invention. For example, the acrylic compositions may be formed into acrylic sheet or sheet molding compounds (SMC), for example by techniques known in the art such as cell cast, continuous cast, and/or extrusion, for use in thermoforming processes. Alternatively, the acrylic compositions may be formed into pellets that are useful for applications that involve extrusion, coextrusion and/or pultrusion. Additionally, the acrylic compositions may be in the form of a powder for various coating applications and for use in paints or other coating applications, with or without solvents or suspending agents such as fillers.

In some embodiments, methods of the present invention include methods of applying a polyurethane composition to an acrylic substrate formed from an acrylic composition as discussed above. In some embodiments, the substrate may be in the form of an acrylic sheet or sheet molding compound or may be an article formed or thermoformed from acrylic sheet or sheet molding compound. Non-limiting examples of thermoforming include injection molding, vacuum suction, blow molding, and plug assisted. The polyurethane may be applied directly to the acrylic substrate as a coating, film or spray and may bond and/or exhibit good adhesion to the acrylic substrate. For example, the polyurethane may be applied to a surface of a shaped acrylic article such as a bath, vanity, sink, spa, shower, shower tray, container, sign, lighting, fixture, architectural component such as a window profile, or building material to provide various desirable properties discussed herein.

In other embodiments, the acrylic composition may be applied to a polyurethane substrate. In some embodiments, the acrylic composition may be in the form of pellets that may be extruded or co-extruded with a polyurethane to form an acrylic coated polyurethane article or an acrylic capped polyurethane article such as, but not limited to, building materials (e.g., siding, window lintels, walls, work surface) and mechanical parts (e.g., car parts). For example, polyurethane can be formed by pultrusion into various articles and acrylic capped with a more or less simultaneous extrusion of an acrylic composition of the present invention. In some embodiments, the acrylic composition is applied, for example extruded, to a virgin or recently formed polyurethane substrate such as within 30 minutes, for example less than 10 minutes, after the polyol and polyisocyanate are mixed.

In other embodiments, the acrylic composition may be in the form of a powder, a suspension, an emulsion, a powder in a solvent or a solution such as a paint, coating and/or ink, and may be applied to a polyurethane substrate by coating, capping, painting, spraying or other conventional coating techniques. For example, the acrylic composition may be applied to siding, window lintels, walls, polyurethane-containing particle board articles such as furniture and shelves, architectural components such as moldings, work surfaces and appliances to form an article comprising one or more acrylic layers bound to a polyurethane substrate.

In some embodiments, the acrylic composition may be custom-colored and/or adapted to be heat-tolerant.

EXAMPLE

The following examples are given as particular embodiments of the invention to demonstrate the practice and advantages thereof. It is to be understood that the examples are given by way of illustration and are not intended to limit the specification or the claims that follow in any manner.

Example 1

Comparative Samples A-B and Inventive Samples 1-3
Chisel Test

A series of cured acrylic substrate samples were prepared and the surface of the samples was cleaned with acetone and dried. The acrylic samples were then sprayed with the a two-component polyurethane mixture (Isotec TP1155-4 from Isotec International which comprises a polymeric MDI (CAS 9016-87-9) and a proprietary mix of polyols and an amine catalyst). The acrylic/polyurethane article was then cut into one-half inch strips. The adhesive strength between the acrylic and polyurethane layers was tested by using a chisel hammer (1.5 lb with a 12" handle) directed at the interface of the two layers. See Table 1.

TABLE 1

Adhesive Strength Between a Polyurethane Layer and an Acrylic Layer As a Function of Using Acrylic Formulations with a Monofunctional Chain Transfer Agent vs. Acrylic Formulations with a Multifunctional Chain Transfer Agent

| | | Chain Transfer Agent | | |
|---|---|---|---|---|
| Acrylic Sample | Description | Monofunctional Lauryl Mercaptan (wt. %) | Polyfunctional PETMP (wt. %) | Cleaved Apart |
| A (control) | Lucite XL ™ BN6528 | 0 | 0 | Adhesive Failure |
| B (control) | Lucite ™ Celestial Granite ™ | 0.20 | 0 | Adhesive Failure |
| 1 | Lucite ™ Celestial Granite ™ | 0 | 0.25 | Partial Cleavage (Adhesive/Cohesive) |
| 2 | Clear Extruded Sheet | 0 | 0.45 | No Cleavage |
| 3 | White Extruded Sheet | 0 | 0.45 | No Cleavage |

In both control samples A and B, the two layers cleanly and easily separated via an adhesive failure mode between the two layers. Sample 1 was partially unable to be cleaved (good bond strength). Samples 2 and 3 were unable to be cleaved (high bond strength).

Example 2

Comparative Samples C-D and Inventive Samples 4-5
Peel Test

A series of acrylic-polyurethane test specimens were prepared. See Table 2. Adhesive strength was determined by using a fixed arm peel test. The isocyanate-containing composition of the polyurethane substrate had a 1.5:1.0 molar ratio of isocyanate to polyol, respectively.

Specimens for conducting the fixed arm peel test were rectangular shaped with dimensions of 40 mm×110 mm. The thickness of the polyurethane, which was used as the peel arm, and acrylic substrate were approximately 4 mm and 3.2 mm, respectively. A razor blade was used initially to split the interface (D) of the specimens to establish a peel fracture. The acrylic substrate side of the specimens was adhered to a peel table.

A peel jig was used to separate the two layers. The peel jig was fixed to the top of the unadhered material of the polyurethane peel arm. The angle between the substrate and the peel arm was fixed at 60°. The jig was attached to an Instron 5565 testing machine, so that as peel occurs the peel angle is maintained constant by the jig moving along a low friction linear bearing system. A 100 N load cell was used. The peel test speed was 10 mm/min. The force versus displacement ($J/m^2$) was recorded for each sample.

TABLE 2

Adhesive Strength Between a Polyurethane Substrate on an Acrylic Substrate As a Function of Using Acrylic Formulations with a Multifunctional Chain Transfer Agent or Multifunctional Crosslinker

| Acrylic Sample | Description | Chain Transfer Agent 3-aminothiophenol (wt. %) | Crosslinker Pentaerythritol-triacrylate (wt. %) | Adhesive Strength ($J/m^2$) |
|---|---|---|---|---|
| C (control) | GR7121 Starry night | 0 | 0 | 53 |
| D (control) | WT6064 | 0 | 0 | 62 |
| 4 | GR7121 + chain transfer agent | 0.15 | 0 | 121 |
| 5 | WT6064 + crosslinker | 0 | 0.1465 | 95 |

Test Notes: GR7121 Starry night is a Celestrial Granite Acrylic Sheet, available from Lucite. WT6064 is a Lucite XL ™ acrylic bath sheet, available from Lucite.

Example 3

Comparative Samples E-I and Inventive Samples 6-15
Compressive Sheer Test

A series of acrylic-polyurethane test specimens were prepared. See Table 3. Bond strength was determined by using a compressive sheer test. The amount of isocyanate was in excess relative to the amount of polyol.

Figure 1B:
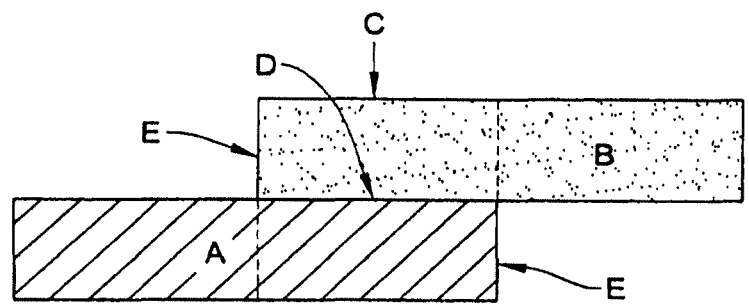
FIG. 1B A post-cut side elevation view of an acrylic substrate (or ABS in the control samples) (A) with polyurethane (B) having an overlapping region (C) of polyurethane and acrylic substrate adhered together at a bond interface (D) and having a surface (E).

The samples were conditioned for approximately forty hours at 23° C.±2° C. and tested at 23° C.±2° C. The exposed perpendicular surfaces (E) of the polyurethane substrate (B) and acrylic substrate (or ABS in the control samples) (A) of the overlapping region (C) in the post-cut specimens were loaded by means of a compression shear fixture having self-aligning loading faces. See FIGS. 1A and 1B. A cross-head rate of 0.020 inch per minute was used. Bond strength was measured as a function of cleavage at the bond interface (D) between the polyurethane substrate (B) and acrylic substrate (or ABS in the control samples) (A) in the overlapping region (C). Maximum compressive strength represented maximum force at specimen failure.

TABLE 3

Bond Strength Between a Polyurethane Substrate on an Acrylic Substrate As a Function of Using Acrylic Formulations with a Multifunctional Chain Transfer Agent vs. ABS

| Description | Sample | Chain Transfer Agent PETMP (ppm) | A Acrylic Thickness (in.) | B Polyurethane Thickness (in.) | C Width (in.) | C Length (in.) | Maximum Compressive Strength (lbf) | Maximum Compressive Strength (psi) | D Bond Strength |
|---|---|---|---|---|---|---|---|---|---|
| GR-7121 + | E | 0 | 0.146 | 0.236 | 0.999 | 0.506 | 1670 | 3300 | No Failure |
| ABS and | F | 0 | 0.140 | 0.236 | 0.999 | 0.509 | 1490 | 2920 | No Failure |
| Polyurethane | G | 0 | 0.135 | 0.235 | 1.004 | 0.504 | 1390 | 2740 | Bond Failure |
| (Control) | H | 0 | 0.150 | 0.234 | 1.005 | 0.508 | 1530 | 2990 | No Failure |
|  | I | 0 | 0.148 | 0.236 | 0.996 | 0.500 | 1510 | 3030 | No Failure |
| GR-7121 + | 6 | 2538 | 0.144 | 0.155 | 1.005 | 0.507 | 1680 | 3310 | Partial Bond Failure |
| PETMP and | 7 | 2538 | 0.145 | 0.155 | 0.995 | 0.500 | 1560 | 3140 | Partial Bond Failure |
| Polyurethane | 8 | 2538 | 0.143 | 0.154 | 1.007 | 0.508 | 1730 | 3380 | Partial Bond Failure |
|  | 9 | 2538 | 0.143 | 0.153 | 1.006 | 0.512 | 1640 | 3180 | Bond Failure |
|  | 10 | 2538 | 0.139 | 0.156 | 1.007 | 0.509 | 1900 | 3720 | Partial Bond Failure |
|  | 11 | 4500 | 0.142 | 0.176 | 1.004 | 0.512 | 1780 | 3460 | No Failure |
|  | 12 | 4500 | 0.140 | 0.181 | 1.004 | 0.510 | 1860 | 3640 | No Failure |
|  | 13 | 4500 | 0.142 | 0.180 | 1.004 | 0.512 | 1710 | 3320 | No Failure |
|  | 14 | 4500 | 0.146 | 0.175 | 1.004 | 0.507 | 1750 | 3440 | No Failure |
|  | 15 | 4500 | 0.139 | 0.181 | 1.004 | 0.510 | 1810 | 3540 | No Failure |

All publications and patent applications mentioned in this specification are herein incorporated by reference in their entirety to the same extent as if each individual publication or patent application was specifically and individually indicated to be incorporated by reference herein in its entirety.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. An article, comprising a cured acrylic composition directly bound to an isocyanate-containing composition; wherein:
   i) the cured acrylic composition comprises:
      a) an acrylic polymer formed by polymerization of a monomer or mixture of monomers selected from the group consisting of: methyl methacrylate; ethyl methacrylate; propyl methacrylate; isopropyl methacrylate; n-butyl methacrylate; iso-butyl methacrylate; t-butyl methacrylate; pentyl methacrylate; 2-ethylhexyl methacrylate; heptyl methacrylate; octyl methacrylate; isooctyl methacrylate; nonyl methacrylate; decyl methacrylate; isodecyl methacrylate; dodecyl methacrylate; tridecyl methacrylate; undecyl methacrylate; cyclohexyl methacrylate; isobornyl methacrylate; bornyl methacrylate; tricyclodecanyl methacrylate; dicyclopentanyl methacrylate; dicyclopentenyl methacrylate; cyclohexyl methacrylate; benzyl methacrylate; 4-butylcyclohexyl methacrylate; dicyclopentenyl methacrylate; methacrylic acid; methyl acrylate; ethyl acrylate; propyl acrylate; butyl acrylate; pentyl acrylate; hexyl acrylate; octyl acrylate; nonyl acrylate; isodecyl acrylate; lauryl acrylate; isobutyl acrylate; t-butyl acrylate; 2-ethylhexyl acrylate; cyclohexyl acrylate; methylcyclohexyl acrylate; trimethylcyclohexyl acrylate; tertiarybutylcyclohexyl acrylate; isobornyl acrylate; and acrylic acid; and
      b) at least one residue of a multifunctional chain transfer agent, said multifunctional chain transfer agent residue comprising a reacted isocyanate-reactive group that has reacted with an isocyanate in the isocyanate-containing composition; and
   ii) the direct bond is between the multifunctional chain transfer agent residue within the cured acrylic composition and the isocyanate within the isocyanate-containing composition.

2. The article of claim 1, wherein said direct bond is between the reacted isocyanate-reactive group of the multifunctional chain transfer agent residue within the cured acrylic composition and the reacted isocyanate within the isocyanate-containing composition.

3. The article of claim 1, wherein the multifunctional chain transfer agent residue is derived from a multifunctional chain transfer agent comprising:
   a) an isocyanate-reactive group; and
   b) at least one chain transfer moiety.

4. The article of claim 3, wherein the multifunctional chain transfer agent is selected from a group consisting of pentaerythritol tris(3-mercaptopropionate), pentaerythritol tris(2-mercaptoacetate), pentaerythritol tetra(2-mercaptoacetate), pentaerythritol tetra(3-mercaptopropionate), or trimethylolpropane tris (2-mercaptoacetate).

5. The article of claim 3, wherein the multifunctional chain transfer agent is pentaerythritol tetra(3-mercaptopropionate).

6. The article of claim 3, wherein the direct bond is a carbamate bond, a thiocarbamate bond, or a carbamide bond.

7. The article of claim 1, wherein the cured acrylic composition comprises 0.01-10 wt. % of the multifunctional chain transfer agent prior to binding to the isocyanate-containing composition.

8. The article of claim 1, wherein the cured acrylic composition further comprises one or more multifunctional crosslinking agents, or residues thereof.

9. The article of claim 8, wherein the one or more multifunctional crosslinking agents, or residues thereof is directly bound to the isocyanate-containing composition.

10. The article of claim 1, wherein the isocyanate-containing composition is polyurethane.

11. The article of claim 10, wherein the direct bond between the cured acrylic composition and the polyurethane provides increased adhesive strength, according to the chisel test.

12. The article of claim 1, wherein the direct bond between the cured acrylic composition and the polyurethane is exclusive of a lamination layer.

13. The article of claim 1, wherein the article comprises an acrylic substrate layer having a polyurethane material layer directly bonded thereto.

14. The article of claim 1, wherein the article comprises an acrylic substrate layer having a polyurethane material layer directly bonded thereto, exclusive of a lamination layer there between.

15. The article of claim 1, wherein the article is formed by:
  i) formulating an acrylic composition having a multifunctional chain transfer agent, wherein said multifunctional chain transfer agent comprises at least one chain transfer moiety and an isocyanate-reactive group;
  ii) curing the acrylic composition; and
  iii) bonding the cured acrylic composition with an isocyanate-containing composition to form a bond by reacting at least a portion of the multifunctional chain transfer agent with the isocyanate-containing composition.

16. The article of claim 15, wherein said bonding occurs after applying a mixture of said isocyanate-containing composition onto said cured acrylic composition.

17. The article of claim 15, wherein said bonding occurs after coating said isocyanate-containing composition onto said cured acrylic composition.

18. The article of claim 1, wherein the article is formed by:
  i) formulating an acrylic composition having:
    a) a multifunctional crosslinker, comprising an isocyanate-reactive group; and/or
    b) a multifunctional chain transfer agent, comprising at least one chain transfer moiety and an isocyanate-reactive group;
  ii) curing the acrylic composition; and
  iii) reacting the cured acrylic composition with an isocyanate-containing composition to form a bond.

19. The article of claim 18, wherein said bonding occurs after applying a mixture of said isocyanate-containing composition onto cured said acrylic composition.

20. The article of claim 18, wherein said bonding occurs after coating said isocyanate-containing composition onto said cured acrylic composition.

21. The article of claim 1, wherein the one or more monomers selected from the group consisting of: methyl methacrylate, ethyl methacrylate, 2-ethylhexyl methacrylate, n-butyl methacrylate, methyl acrylate, ethyl acrylate, and n-butyl acrylate.

22. The article of claim 1, wherein the cured acrylic composition is a cured acrylic sheet.

23. The article of claim 22, wherein the one or more monomers selected from the group consisting of: methyl methacrylate, ethyl methacrylate, 2-ethylhexyl methacrylate, n-butyl methacrylate, methyl acrylate, ethyl acrylate, and n-butyl acrylate.

24. The article of claim 15, wherein the cured acrylic composition is a cured acrylic sheet.

25. The article of claim 18, wherein the cured acrylic composition is a cured acrylic sheet.

* * * * *